(12) United States Patent
Ano (10) Patent No.: US 6,788,288 B2
(45) Date of Patent: Sep. 7, 2004

(54) COORDINATE INPUT DEVICE AND PORTABLE INFORMATION APPARATUS EQUIPPED WITH COORDINATE INPUT DEVICE

(75) Inventor: Tadashi Ano, Takarazuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 368 days.

(21) Appl. No.: 09/845,964

(22) Filed: Apr. 30, 2001

(65) Prior Publication Data

US 2002/0030665 A1 Mar. 14, 2002

(30) Foreign Application Priority Data

Sep. 11, 2000 (JP) ........................................ 2000-274628

(51) Int. Cl.[7] ................................................ G09G 5/08
(52) U.S. Cl. ...................... 345/157; 345/163; 345/159
(58) Field of Search ............................... 345/157, 156, 345/159, 169, 163, 184, 172, 160, 27, 419, 823, 858; 348/734; 455/566

(56) References Cited

U.S. PATENT DOCUMENTS

| | | | | |
|---|---|---|---|---|
| 4,866,542 A | * | 9/1989 | Shimada et al. ............... | 386/69 |
| 5,164,712 A | * | 11/1992 | Niitsuma ..................... | 345/184 |
| 5,432,530 A | * | 7/1995 | Arita et al. .................. | 345/159 |
| 5,805,165 A | * | 9/1998 | Thorne, III et al. ........ | 345/823 |
| 5,934,191 A | * | 8/1999 | Tukahara et al. ......... | 101/128.4 |
| 6,037,954 A | * | 3/2000 | McMahon ................... | 345/169 |
| 6,062,749 A | * | 5/2000 | Oikawa et al. ............. | 400/110 |
| 6,075,575 A | * | 6/2000 | Schein et al. ............... | 348/734 |
| 6,107,988 A | * | 8/2000 | Phillipps ..................... | 345/156 |
| 6,126,561 A | * | 10/2000 | Mark ......................... | 473/588 |
| 6,154,201 A | * | 11/2000 | Levin et al. ................ | 345/184 |
| 6,177,924 B1 | * | 1/2001 | Bae ............................ | 345/157 |
| 6,225,980 B1 | * | 5/2001 | Weiss et al. ................ | 345/161 |
| 6,243,741 B1 | * | 6/2001 | Utsumi ....................... | 709/208 |
| 6,307,535 B1 | * | 10/2001 | Kim et al. ................... | 345/157 |
| 6,313,731 B1 | * | 11/2001 | Vance ........................ | 338/185 |
| 6,336,052 B1 | * | 1/2002 | Ouellet et al. ............... | 700/83 |
| 6,351,657 B2 | * | 2/2002 | Yamada ...................... | 455/566 |
| 6,424,335 B1 | * | 7/2002 | Kim et al. ................... | 345/158 |
| 6,524,187 B2 | * | 2/2003 | Komata ....................... | 463/37 |
| 6,525,713 B1 | * | 2/2003 | Soeta et al. ................. | 345/160 |
| 2001/0017604 A1 | * | 8/2001 | Jacobsen et al. ............. | 345/27 |

* cited by examiner

*Primary Examiner*—Vijay Shankar
*Assistant Examiner*—Prabodh M. Dharia
(74) *Attorney, Agent, or Firm*—RatnerPrestia (57) ABSTRACT

A coordinate input device has
 a keyboard;
 a rotary dial annular in shape and mounted in substantially the same plane as the keyboard, the rotary dial being rotatable within the plane; and
 a rotation detector for detecting the amount and direction of rotation of the rotary dial, and wherein:
 the rotary dial is disposed below the keyboard.

20 Claims, 7 Drawing Sheets

COORDINATE INPUT DEVICE AND PORTABLE INFORMATION APPARATUS EQUIPPED WITH COORDINATE INPUT DEVICE

BACKGROUND OF THE INVENTION

1. Field of the Invention

The present invention relates to a coordinate input device used to manipulate a cursor, window, and the like on a display screen in order to enhance the ease of operation of a portable information apparatus.

2. Description of the Related Art

Portable information apparatuses such as notebook computers are equipped with a built-in pointing device or an externally connected pointing device to enhance their ease of operation. Examples of commonly used pointing devices include mice, flat pads, and trackballs. The pointing device detects, for example, the amount and direction of rotation of a trackball, and the portable information apparatus causes the cursor on the display screen to move on the basis of the result of the detection and accomplishes various operations in response to button click operations that the user performs at the new cursor position.

Recently, mice that incorporate a rotating dial (wheel) have come into popular use; with this type of mouse, when a document too large to be shown within one screen is displayed, the wheel mounted in the mouse is rotated to scroll the document to bring other portions of the document into the screen. Using the rotating wheel for scrolling enhances the ease of operation in scrolling since it not only accomplishes scrolling at high speed but also allows fine adjustment of the scrolling. As an example of a pointing device combined with a wheel, there is also available a device that is equipped with a dial ring encircling a trackball, and that is designed for use, for example, with an ultrasonic diagnostic instrument, to manipulate three-dimensional data by detecting an coordinate input on a third axis.

Figure 3:
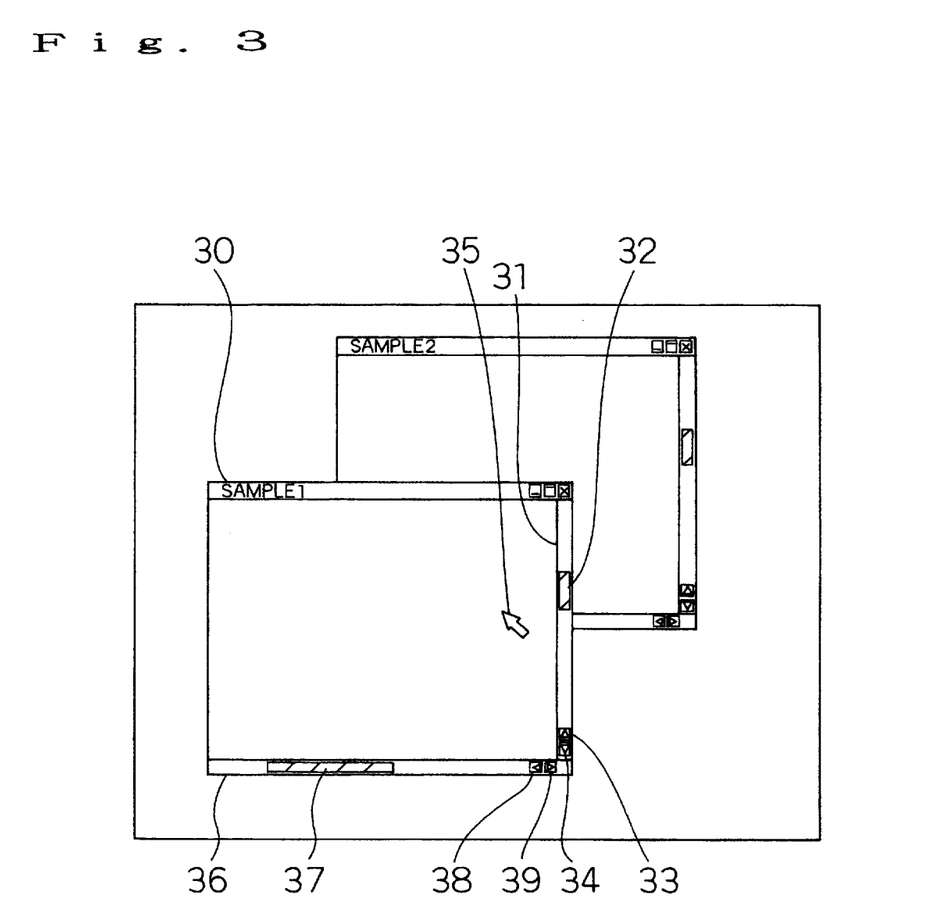
FIG. 3 is a diagram for explaining scrolling operations performed using a wheel 8.

Referring to FIG. 3, a description will be given of a method of how information such as a document or image displayed within a window screen is scrolled using a conventional mouse or trackball. In FIG. 3, reference numeral 30 is a window screen displayed on a display device, 31 is a vertical scroll bar, 32 is a vertical scroll box, 33 is a scroll up button, 34 is a scroll down button, and 35 is a cursor. When the cursor 35 is moved to the scroll up button 33 by using the mouse, and the mouse is clicked on it, the information displayed in the screen is scrolled upward across the screen; likewise, when the cursor 35 is positioned on the scroll down button 34, and the mouse is clicked on it, the information displayed in the screen is scrolled downward across the screen.

Since the screen is scrolled up or down by an amount proportional to the number of times or the length of time that the scroll up button 33 or the scroll down button 34 is clicked or held down by the mouse, the desired part of the information can be correctly brought into the screen for viewing. The information displayed within the screen can also be scrolled vertically by positioning the cursor 35 on the vertical scroll box 32 and moving the mouse forward or backward while keeping the mouse button pressed down (dragging the vertical scroll box 32). Horizontal scrolling is performed in like manner by using a scroll left button 38, a scroll right button 39, and a horizontal scroll box 37 provided at the bottom of the window screen 30.

To accomplish the above operations by using a trackball instead of a mouse, the trackball is rotated to move the cursor 35 across the window screen 30 and, by performing a designated left click operation, the information can be scrolled in the same manner as when it is done using a mouse.

Figure 6:
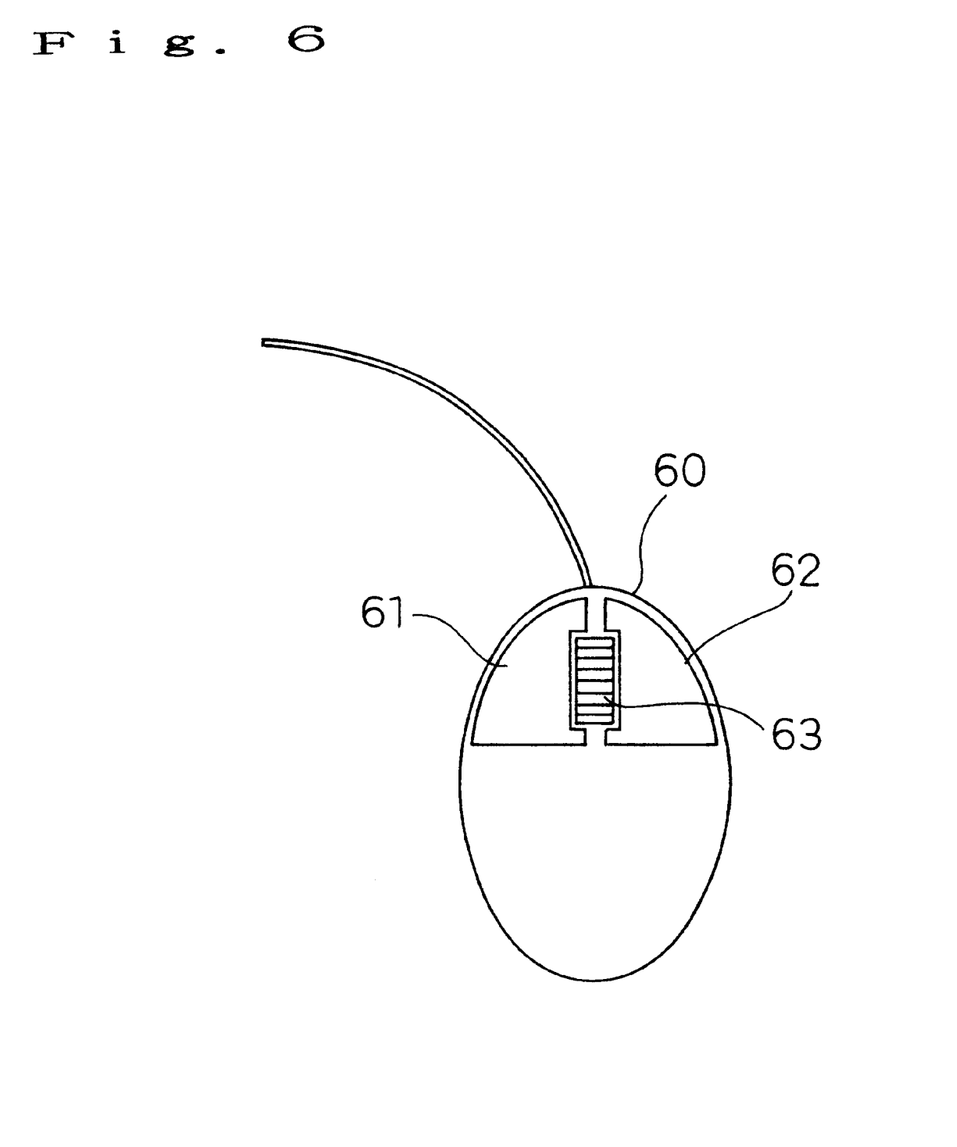
FIG. 6 is an external view of a mouse as a prior art coordinate input device.

Recently, a wheel mouse, a mouse having a forward/backward rotating wheel between left and right click buttons as shown in FIG. 6, has come into use. Reference numeral 60 is the mouse body, 61 is the left button, 62 is the right button, and 63 is the wheel. When the cursor 35 is moved to an arbitrary position within the window screen 30, and the wheel 63 is rotated forward, the information displayed within the screen is scrolled in the upward direction in the same manner as when the scroll up button 33 is pressed; likewise, when the wheel 63 is rotated backward, the displayed information is scrolled in the downward direction in the same manner as when the scroll down button 34 is pressed. Since the wheel 63 can be rotated using only a forefinger, the user can operate it easily even when the amount of scroll is large. However, on a notebook computer or the like, since the user has to move his hand off the keyboard to operate the wheel, it has been difficult to operate the wheel while inputting characters.

As described above, while the wheel offers enhanced usability, the prior art wheel mouse has had the problem that when inputting characters, for example, the user has to suspend the current task to operate the wheel as he has to move his hand off the home position on the keyboard and put his hand on the mouse to rotate the wheel. Furthermore, in the case of a portable electronic apparatus, the space for operating the wheel mouse has had to be provided in addition to the space for the apparatus itself.

In view of the above problems with the prior art, it is an object of the present invention to provide a coordinate input device that allows the user to operate the wheel without having to move his hand off the keyboard, and also provide a portable information apparatus equipped with such a coordinate input device.

SUMMARY OF THE INVENTION

One aspect of the present invention is a coordinate input device comprising: to claim 1) is a coordinate input device comprising:

a keyboard;

a rotary dial annular in shape and mounted in substantially the same plane as said keyboard, said rotary dial being rotatable within said plane; and a rotation detector for detecting the amount and direction of rotation of said rotary dial, and wherein:

said rotary dial is disposed below said keyboard.

A further aspect of the present invention is a coordinate input device, wherein said rotary dial is disposed so that the center of said rotary dial lies on a line that substantially bisects the width of said keyboard.

A still another aspect of the present invention is a coordinate input device, further comprising a depression detector for detecting depression of said rotary dial when said rotary dial is depressed in a direction perpendicular to said plane.

Yet another aspect of the present invention is a coordinate input device, further comprising a trackball, a second rotation detector for detecting the amount and direction of rotation of said trackball, and one or more click buttons provided in positions adjacent to said trackball, and wherein:

said trackball and said click buttons are disposed within said plane in such a manner as to be surrounded by said rotary dial.

Still yet another aspect of the present invention is a coordinate input device, further comprising a flat pad which is touched by an object, a movement detector for detecting the distance and direction of movement of said object while said flat pad is being touched with said object, and one or more click buttons provided in positions adjacent to said flat pad, and wherein:

said flat pad and said click buttons are disposed within said plane in such a manner as to be surrounded by said rotary dial.

A further aspect of the present invention is a coordinate input device, wherein said rotary dial is constructed so that when said rotary dial is rotated, various parts forming said rotary dial can stay stable in a plurality of positions within said plane.

A still further aspect of the present invention is a portable information apparatus comprising:

a coordinate input device as described in 1st invention;

a display device having a screen for displaying information and a pointer for indicating a portion within said screen; and a controller for causing said information or said pointer displayed within said screen to move according to the amount and direction of rotation of said rotary dial.

A yet further aspect of the present invention is a portable information apparatus, wherein said screen includes a scroll bar for scrolling said displayed information vertically or horizontally across said screen, and said controller causes said information displayed within said screen to scroll in accordance with the amount and direction of rotation of said rotary dial when said pointer is positioned on said scroll bar.

A still yet further aspect of the present invention is a portable information apparatus, wherein said information comprises a plurality of images, said pointer is used to select one of said plurality of images, and said controller causes said pointer to move in accordance with the amount and direction of rotation of said rotary dial.

An additional aspect of the present invention is a portable information apparatus, comprising an expansion controller for causing said image at which said pointer is positioned to be expanded to a larger size for display in said screen.

A still additional aspect of the present invention is a portable information apparatus, comprising an application activator for activating a prescribed application, while at the same time, capturing said image at which said pointer is positioned.

A yet additional aspect of the present invention is a portable information apparatus comprising:

a coordinate input device as described in 1st invention;

a display device having a screen with a plurality of image display areas arranged in the form of a ring and a pointer for indicating one of said plurality of image display areas; and a controller for causing said pointer displayed within said screen to move according to the amount and direction of rotation of said rotary dial.

A still yet additional aspect of the present invention is a portable information apparatus comprising:

a coordinate input device as described in 1st invention;

a display device having a screen with a plurality of image display areas arranged in the form of a ring and a pointer for indicating one of said plurality of image display areas; and a controller for causing a plurality of images to be displayed in said respective image display areas in such a manner that said plurality of images are displayed sequentially moving through said image display areas in accordance with the amount and direction of rotation of said rotary dial.

A supplementary aspect of the present invention is a portable information apparatus, wherein the size of said plurality of image display areas monotonically changes along said ring, and/or said plurality of image display areas are arranged with any two adjacent image display areas overlapping each other.

A still supplementary aspect of the present invention is a portable information apparatus, wherein said plurality of images are temporally successive images.

A yet supplementary aspect of the present invention is a portable information apparatus, wherein said controller causes said plurality of images to be displayed in said respective image display areas in such a manner that, of said plurality of images, the most future image is displayed in the smallest size.

A still yet further supplementary aspect of the present invention is a portable information apparatus, comprising a position indicator for indicating in digital or analog form where in an entire set of said plurality of images is positioned the image displayed in a prescribed one of said plurality of image display areas.

A still yet additional supplementary of the present invention is a portable information apparatus, wherein said plurality of images are images such that the number of fields to be displayed per unit time is predetermined, and said controller causes said respective images to move by a number equal to the number of fields per second when said rotary dial is rotated through one revolution.

One aspect of the present invention is a portable information apparatus, wherein said controller performs control so that the number of times that said respective images are moved while said rotary dial is rotated through one revolution is varied according to the rotational speed of said rotary dial.

Another aspect of the present invention is a portable information apparatus, comprising an application activator for activating a prescribed application, while at the same time, capturing the image displayed in a prescribed one of said plurality of image display areas.

DESCRIPTION OF REFERENCE NUMERALS

1. PORTABLE INFORMATION APPARATUS
2. DISPLAY
3. BODY
4. KEYBOARD
5. TRACKBALL
6. LEFT CLICK BUTTON
7. RIGHT CLICK BUTTON
8. WHEEL
15. X-DIRECTION DETECTOR
16. LEFT CLICK SWITCH
17. RIGHT CLICK SWITCH
18. WHEEL DETECTOR
19. WHEEL SWITCH
20. CONTROLLER
21. APPLICATION ACTIVATOR
30, 40, 50. WINDOW SCREEN
31, 41. VERTICAL SCROLL BAR
32. VERTICAL SCROLL BOX
33, 43. SCROLL UP BUTTON
34. 44. SCROLL DOWN BUTTON
35. CURSOR
36. HORIZONTAL SCROLL BAR
37. HORIZONTAL SCROLL BOX
38. SCROLL LEFT BUTTON
39. SCROLL RIGHT BUTTON
42. IMAGE
45. SELECTED IMAGE
46. POINTER
52. IMAGE DISPLAY AREA
54. SLIDE BAR
55. PICTURE COUNT
56. POINTER
60. MOUSE BODY
61. LEFT BUTTON
62. RIGHT BUTTON
63. WHEEL

DESCRIPTION OF THE PREFERRED EMBODIMENTS

The preferred embodiments of the present invention will be described below with reference to the accompanying drawings.

(Embodiment 1)

Figure 1:
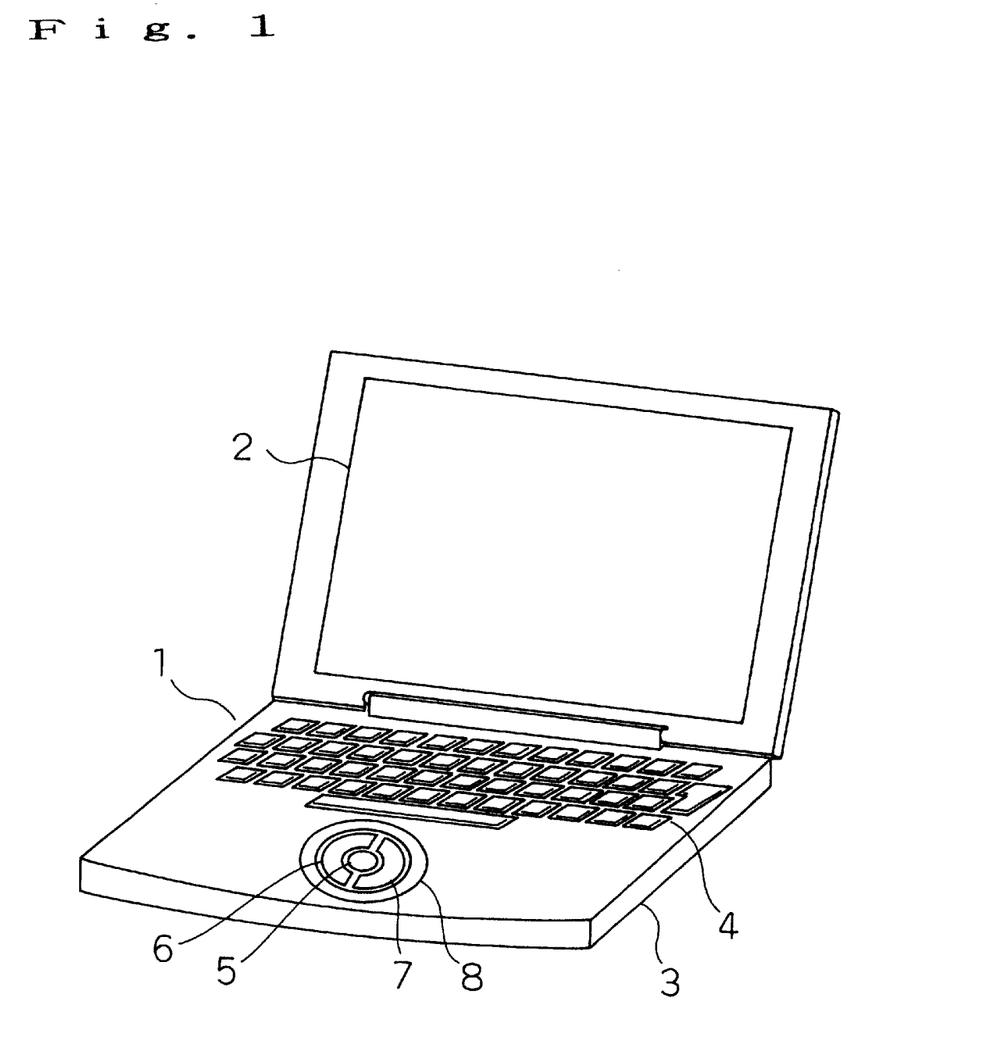
FIG. 1 is a perspective view showing the external appearance of a portable information apparatus equipped with a coordinate input device according to one embodiment of the present invention.

FIG. 1 is a perspective view showing the external appearance of a portable information apparatus equipped with a coordinate input device according to one embodiment of the present invention. The portable information apparatus 1 comprises a display 2 for displaying various kinds of information such as created text, calculation results, and web pages, and a body 3 containing other electronic circuits, etc. The body 3 incorporates the coordinate input device which comprises a keyboard 4 as an input device, a trackball 5, a left click button 6 and right click button 7 respectively corresponding to the left and right click buttons of a mouse, and an annular wheel 8 as one example of a rotary dial.

The keyboard 4, the trackball 5, the left click button 6, the right click button 7, and the wheel 8 are arranged in substantially the same plane. The wheel 8 is mounted in a position substantially centralized in the space provided before the keyboard 4, as shown in FIG. 1. In other words, the wheel 8, which is mounted in the same plane as the keyboard 4, is located below the keyboard 4, and is arranged in such a manner that the center of the wheel 8 lies on the line that substantially bisects the width of the keyboard 4. Further, the wheel 8 is disposed in such a manner as to encircle the trackball 5, left click button 6, and right click button 7.

Figure 2:
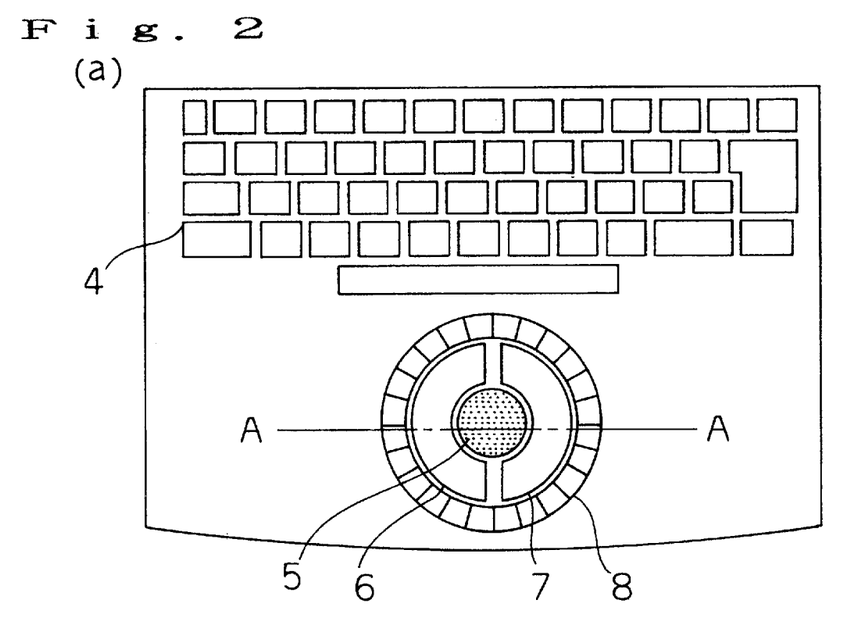
FIG. 2(a) is a top plan view showing the layout of the coordinate input device according to the embodiment of the present invention.
FIG. 2(b) is a cross sectional view of the coordinate input device according to the embodiment of the present invention.

The coordinate input device will be described in further detail with reference to FIG. 2. FIG. 2(a) is a top plan view showing the layout of the coordinate input device, and FIG. 2(b) is a cross sectional view of the coordinate input device taken along line A—A of FIG. 2(a). Reference numeral 15 is an X-direction detector for detecting the rotation of the trackball 5 in sideways directions, 16 is a left click switch for detecting the depression of the left click button 6, 17 is a right click switch for detecting the depression of the right click button 7, 18 is a wheel detector (rotation detector) for detecting the amount and direction of rotation of the wheel 8, and 19 is a wheel switch (depression detector) for detecting the depression of the wheel 8. The coordinate input device further includes a Y-direction detector (not shown) for detecting the rotation of the trackball 5 in forward/backward directions. The X-direction detector 15 and the Y-direction detector each correspond to one example of a second rotation detector in the coordinate input device of the present invention.

Further, as shown in FIG. 2(b), the portable information apparatus 1 includes a controller 20 for performing various control operations in accordance with the amount and direction of rotation of the wheel 8 that the wheel detector 18 detects. The function of the controller 20 will be described in detail later by way of example.

The trackball 5 is substantially centralized in the space provided before the keyboard 4, so that the user can operate the trackball 5 without substantially moving the hand off the keyboard 4 on which he is entering characters. Usually, the user operates the trackball 5 with the thumb or the forefinger of his dominant hand. When the user rotates the trackball 5, the amount and direction of rotation in the X-axis (sideway) direction are detected by the X-direction detector 15. The method of detection is the same as employed in conventional trackballs, and therefore, will not be described here. The rotation in the Y-axis (forward/backward) direction is detected by the Y-direction detector (not shown). The left click button 6 and right click button 7 are arranged in such a manner to encircle the trackball 5, and the depression of the left click button 6 is detected by the left click switch 16, while the depression of the right click button 7 is detected by the right click switch 17.

Encircling the trackball 5 and the left and right click buttons 6 and 7 is mounted the wheel 8, as earlier described, which is constructed from a doughnut-shaped disk. The wheel 8 is freely rotatable around the trackball 5, and the amount and direction of its rotation are detected by the wheel detector 18 and converted into electrical signals. The wheel detector 18 may be constructed to detect the amount and direction of rotation of the wheel 8 by a method using a mechanical contact switch or by a non-contact method, etc. using a light emitting diode and a photo transistor. The wheel 8 is normally urged upward by a spring or the like, and when the wheel 8 is depressed by a finger, the depression of the wheel 8 is detected by the wheel switch 19.

Next, a description will be given of how a window is manipulated using the coordinate input device described above.

The operation of the trackball 5 is the same as that described in the prior art, and will not be described here. The following description deals with the operation of the wheel 8. In FIG. 3, when the cursor 35 is moved to an arbitrary position within the window screen 30, and the wheel 8 is rotated in the clockwise direction, the wheel detector 18 detects the amount and direction of rotation of the wheel 8, and the controller 20 causes the information displayed in the window screen 30 to scroll in the downward direction across the screen by an amount proportional to the amount of rotation of the wheel 8, as a result of which the content below the content currently displayed in the window screen 30 is moved downward by the amount corresponding to the amount of rotation and thus brought into the window screen 30 for viewing. The controller 20 also causes the vertical scroll box 32 to move downward by an amount corresponding to the amount of scrolling of the information in the window screen 30.

On the other hand, when the wheel 8 is rotated in the counterclockwise direction, the wheel detector 18 detects the amount and direction of rotation of the wheel 8, and the controller 20 causes the information displayed in the window screen 30 to scroll in the upward direction across the screen by an amount proportional to the amount of rotation of the wheel 8, as a result of which the content above the content currently displayed in the window screen 30 is moved upward by the amount corresponding to the amount of rotation and thus brought into the window screen 30 for viewing. The controller 20 also causes the vertical scroll box 32 to move upward by an amount corresponding to the amount of scrolling of the information in the window screen 30.

Next, after the cursor 35 is positioned on the horizontal scroll bar 36 by operating the trackball 15, the wheel 8 is operated. When the wheel 8 is rotated in the clockwise direction, the wheel detector 18 detects the amount and direction of rotation of the wheel 8, and the controller 20 causes the content displayed in the window screen 30 to scroll rightward by an amount proportional to the amount of rotation of the wheel 8. On the other hand, when the wheel 8 is rotated in the counterclockwise direction, the wheel detector 18 detects the amount and direction of rotation of the wheel 8, and the controller 20 causes the content displayed in the window screen 30 to scroll leftward by an amount proportional to the amount of rotation of the wheel 8. Alternatively, the controller 20 may perform control so that the content displayed in the window screen 30 is scrolled leftward when the wheel 8 is rotated in the clockwise direction, and rightward when it is rotated in the counterclockwise direction.

The above-mentioned cursor 35 is an example of a pointer that indicates a portion within the window screen 30.

As is apparent from the above description, since the user can operate the wheel 8 without moving his hand off the home position on the keyboard 4, the amount and direction of scrolling of the information displayed in the window screen 30 can be controlled easily, enhancing easiness in scrolling operation of the window screen 30.

In the above-described embodiment, the wheel (jog dial) 8 has been described as being located around the circumference of the trackball 5 and click buttons 6 and 7, but the wheel (jog dial) 8 need not necessarily be provided around the circumference of the trackball 5 and click buttons 6 and 7. Further, the click buttons have been described as consisting of two buttons, the left and right buttons 6 and 7, but only one click button may be provided or three or more click buttons may be provided. When the click buttons consist of two buttons, the two buttons may be arranged left and right as described above, or may be disposed forward and backward of the trackball 5. That is, when the click buttons consist of a plurality of buttons, their mounting positions are not specifically limited.

The wheel 8 is constructed so that when the wheel 8 is rotated within the plane in which it is mounted, the various parts of the wheel 8 can stay stable in their respective positions within that plane.

Figure 7:
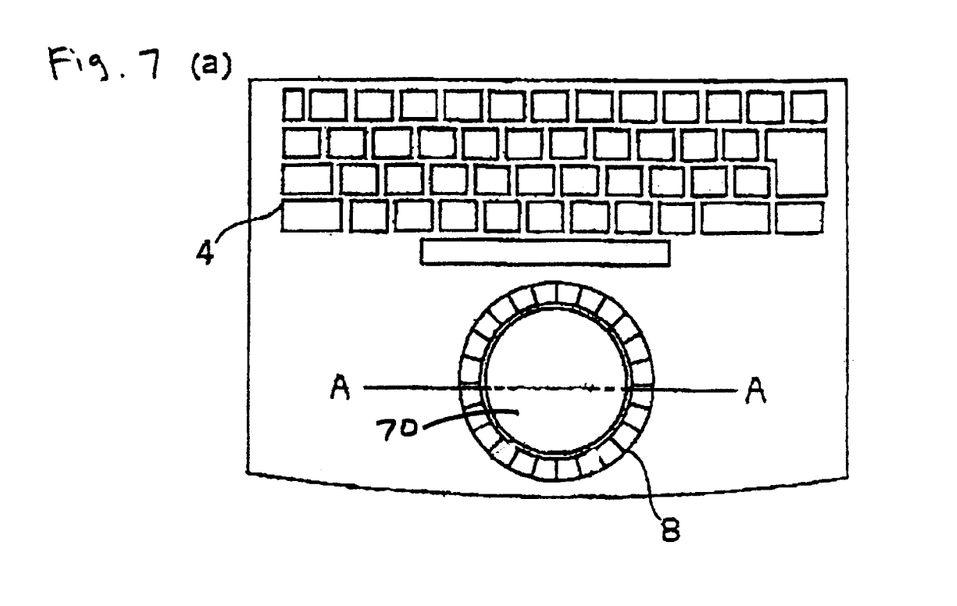
FIG. 7(a) is a top plan view showing the layout of the coordinate input device according to an alternate embodiment of the embodiment shown in FIG. 2(a)
FIG. 7(b) is a cross-sectional view of the coordinate device according to the alternate embodiment of the invention shown in FIG. 7(a).
FIG. 7(c) is another cross-sectional view of the coordinate device according to the alternate embodiment of the invention shown in FIG. 7(a)

Furthermore, the above embodiment has been described as using the trackball 5 as the means of moving the cursor 35, but it will be appreciated that a flat pad 70, shown in FIGS. 7(a) 7(b), and 7(c) may be used instead of the trackball 5. In that case, however, a movement detector for detecting the distance and direction of movement of a finger or other object touching the flat pad must be provided instead of the means of detecting the rotation of the trackball 5.

(Embodiment 2)

Next, a description will be given of a selection operation in which the wheel 8 is operated to select one of a plurality of images displayed within a screen on the display 2 of the above-described portable information apparatus 1.

Figure 4:
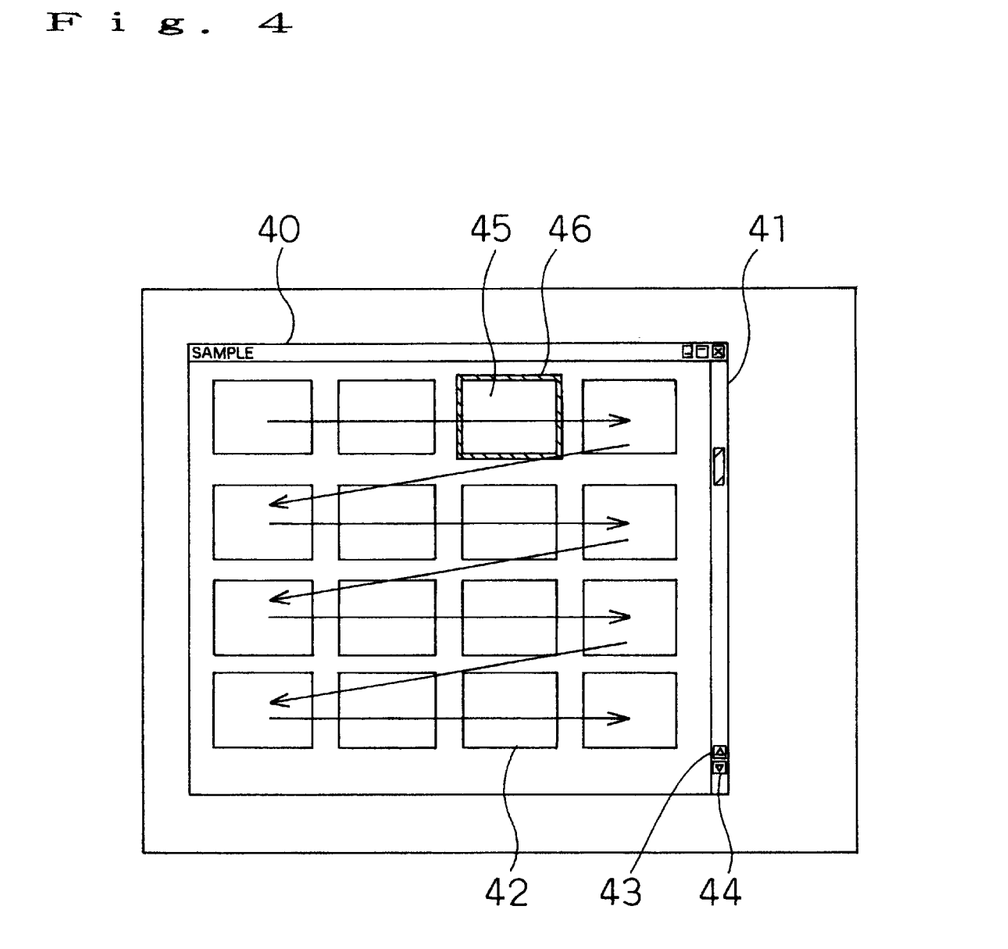
FIG. 4 is a diagram for explaining an image selection operation for selecting one of a plurality of images by using the wheel 8.

FIG. 4 shows one example of the display screen in the selection operation. In FIG. 4, reference numeral 40 is the window screen to be manipulated, 41 is the vertical scroll bar, 42 is a plurality of images transferred from a digital camera or the like, and 45 is the selected image currently selected from among the images 42. In the second embodiment, the pointer 46 surrounding the selected image 45 indicates that the selected image 45 is currently selected. The scroll up button 43 and scroll down button 44 used to scroll the screen are also provided.

The images 42 are images captured by a device such as a digital camera and transferred into the portable information apparatus 1. Recent digital cameras can handle more than 100 images at a time as they support large capacity storage media. Since it is difficult to grasp image content by the file name alone, each image transferred from a digital camera is displayed in the form of a shrunken image of relatively small size. Generally, displaying shrunken images side by side is called a thumbnail preview. In the second embodiment, 16 images, four horizontally and four vertically, are displayed at a time as a thumbnail preview.

Next, one or more images are selected from among the plurality of images displayed as thumbnails. The selection is made, for example, when printing the most favorite image from among the images captured by a digital camera, or when transmitting a selected image by attaching it to a mail message. Though a mouse and a cursor may be used to select a suitable image, in the second embodiment the image is selected using the wheel 8. This method will be described below. Further, for convenience of explanation, it is assumed in the second embodiment that only one image is selected at a time, and that the image selected from among the 16 thumbnail images is highlighted on the screen. The highlighting is accomplished, for example, by encircling the selected image with a red frame (pointer) 46 as earlier described.

With the images displayed as thumbnails as described above, when the wheel 8 is rotated in the clockwise direction, the wheel detector 18 detects the amount and direction of rotation of the wheel 8, and the controller 20 causes the pointer 46 to move in the direction of arrow in FIG. 4 by the number of images corresponding to the amount of rotation of the wheel 8. That is, the controller 20 causes the pointer 46 to move to the right according to the amount of rotation of the wheel 8.

After the pointer 46 is moved to the rightmost image in one row, the controller 20 moves the pointer 46 so that the pointer 46 is positioned at the leftmost image in the next row. When the pointer 46 is successively moved and positioned at the image in the lower right corner in FIG. 4, if the wheel 8 is further rotated, the controller 20 causes the images as a whole to move up one row so that a new row of four images appears at the bottom, or replaces all the 16 images by a new set of 16 images and positions the pointer 46 at the image in the upper left corner.

In this way, since the pointer 46 moves successively according to the amount of rotation of the wheel 8, the user can easily select his favorite image while watching the pointer 46 moving from one thumbnail image to the next.

Next, with the pointer 46 positioned at the most favorite image, the wheel 8 is pressed down. This causes the wheel switch 19 to close, and the selection is thus detected; thereupon, a signal indicating the detection is sent to an application activator 21 (see FIG. 2(b)). Upon receiving the signal from the wheel switch 19, the application activator 21 activates an image related application, for example, mail software for transmission of the selected image as an attached file. After the mail software is activated, usual mail software processing can be performed for transmission or other operation. While only one wheel switch 19 is shown in FIG. 2(b), a plurality of wheel switches 19 may be provided so that depression at any circumferential portion of the wheel 8 can be detected. The above has described an example in which the application is activated in response to the detection by the wheel switch 19, but the application may be activated by using the left click button 6 or the right click button 7 instead of the wheel switch 19.

The second embodiment has been described specifically dealing with the case in which the wheel 8 is rotated in the clockwise direction, but as one can easily see, when the wheel 8 is rotated in the counterclockwise direction, the pointer 46 moves in the direction opposite to the direction of arrow in FIG. 4.

Furthermore, in the second embodiment described above, when the wheel 8 is depressed while the pointer 46 is positioned at the most favorite image, the application activator 21 activates an image related application; alternatively, when the wheel 8 is depressed while the pointer 46 is positioned at the desired image, the controller 20 may perform control so that the image at which the pointer 46 is positioned, that is, the selected image, is expanded to a larger size for display in the window screen 40. In that case, the controller 20 functions as an expansion controller.

(Embodiment 3)

Next, a description will be given of a capture operation in which the wheel 8 is operated to capture a favorite image from among a plurality of still images forming a moving image that is displayed within a screen on the display 2 of the above-described portable information apparatus 1.

Figure 5:
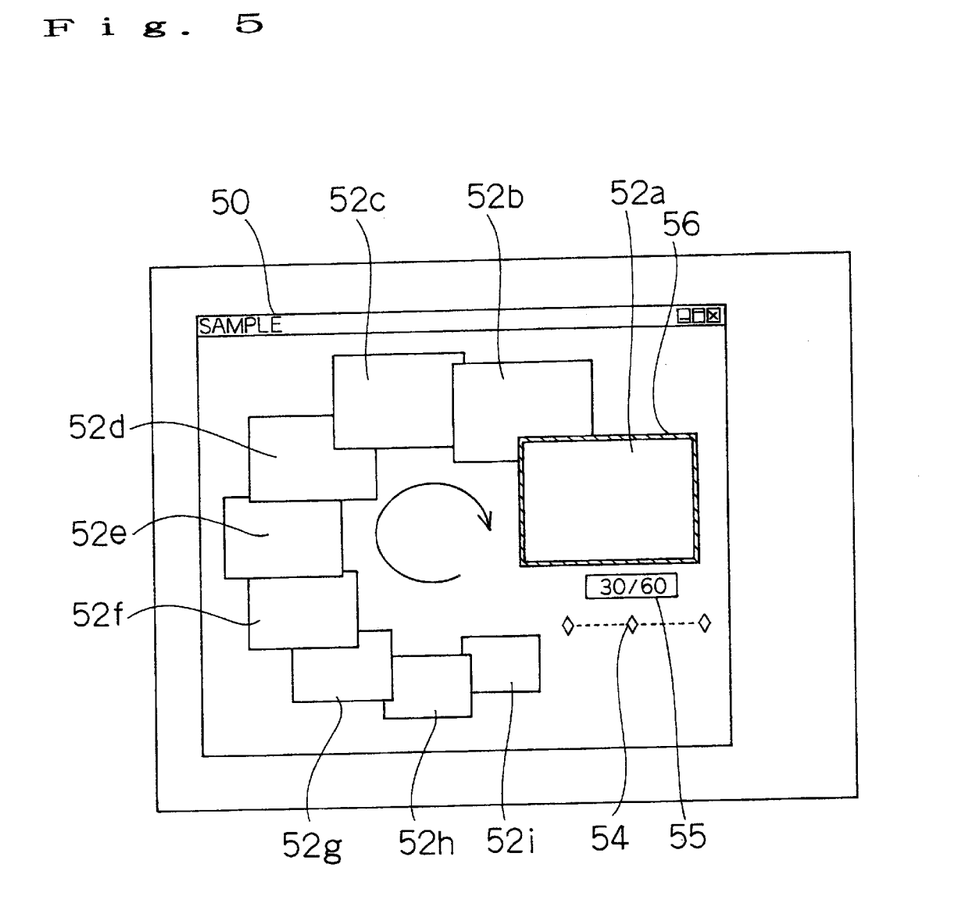
FIG. 5 is a diagram for explaining a moving image capture operation performed using the wheel 8.

FIG. 5 shows one example of the display screen in the capture operation. In FIG. 5, reference numeral 50 is the window screen to be manipulated, 52a to 52i are image display areas provided within the window screen 50, 54 is a slide bar, 55 is a picture count, and 56 is a pointer. In the third embodiment, the image displayed in the image display area 52a enclosed with the pointer 56 is the selected image. The plurality of image display areas 52a to 52i are arranged in a ring form as shown in FIG. 5. Using the nine image display areas 52a to 52i provided within the window screen 50, nine still images can be displayed at once in the window screen 50.

When displaying a moving image within the window screen 50, nine still images forming the moving image can be displayed within the window screen 50; in this case, the controller 20 performs control to display temporally successive nine still images in the respective image display areas 52a to 52i in time order so that, of the temporally successive nine still images forming the moving image, the image earliest in time (past image) will be displayed in the image display area 52a and the image latest in time (future image) in the image display area 52i.

The size of the image display areas 52a to 52i changes monotonically along the ring, as shown in FIG. 5. In the third embodiment, of the plurality of image display areas 52, the image display area 52a is the largest in size and the image display area 52i is the smallest in size. Further, the image display areas 52a to 52i overlap one another, as shown in FIG. 5.

When it is desired to search for a favorite image while reproducing a moving image using a DVC or video capture, the capture operation (not shown) is performed. In the still image capture operation according to the third embodiment, images one second before and after the moment the capture operation is performed are converted into still images. For example, in the case of a DVC, since the moving image consists of 30 still frames per second, a total of 60 still images are captured. Then, the controller 20 presents the earliest captured image (still image) for display in the image display area 52a and the subsequent image (later in time) for display in the image display area 52b. The next subsequent image is displayed in the image display area 52c. In this way, the controller 20 presents the images for display in the respective image display areas 52 in time order in the counterclockwise direction.

In this condition, the wheel 8 is rotated in the clockwise direction. The wheel detector 18 then detects the amount and direction of rotation of the wheel 8, and the controller 20 causes the displayed images to move successively from one image display area 52 to the next in the direction of arrow in FIG. 5 as the wheel 8 is rotated.

For example, when the wheel 8 is rotated in the clockwise direction, the image initially displayed in the image display area 52i is moved from the image display area 52i to the image display area 52h, . . . , to the image display area 52b, and finally to the image display area 52a, as the wheel 8 is rotated. When the wheel 8 is rotated in the clockwise direction by an amount equivalent to one frame, the image subsequent in time to the image initially displayed in the image display area 52i is displayed in the image display area 52i. When the wheel 8 is rotated in the clockwise direction by an amount equivalent to two frames, the image subsequent in time to the image initially displayed in the image display area 52i is first displayed in the image display area 52i and then moved to the image display area 52h for display therein.

Since the images are displayed successively moving through the image display areas 52 as the wheel 8 is rotated in the clockwise direction, as described above, when the wheel 8 is rotated rapidly in the clockwise direction, the image displayed in each image display area 52 is successively replaced by an image newer in time; as a result, when attention is focused on the image display area 52a, images are display as if a moving image were being displayed in the image display area 52a.

The above embodiment has been described specifically dealing with the case in which the wheel 8 is rotated in the clockwise direction, but as one can easily see, when the wheel 8 is rotated in the counterclockwise direction, the images move in the direction opposite to the direction when the wheel 8 is rotated in the clockwise direction.

Thus, the image can be reproduced at fast forward speed by rapidly rotating the wheel 8 in the clockwise direction, and reproduced in the reverse direction by rotating the wheel 8 in the counterclockwise direction.

Further, since the size of the image display areas 52a to 52i increases in the clockwise direction as shown in FIG. 5, when the wheel 8 is rotated in the clockwise direction, the image is displayed gradually increasing in size with the rotation of the wheel 8, and it appears as if the image is surging from behind the screen as the wheel 8 is rotated, that is, as if the image is approaching from the future. As a result, the operation for selecting the image to be displayed in the image display area 52a can be performed intuitively.

A moving image per unit time is made up of a predetermined number of fields of still images. For example, a moving image for one second consists of 30 fields of still images. Therefore, in this embodiment, the controller 20 successively presents images for display in the respective image display areas 52 in such a manner that when the wheel 8 is rotated through one revolution, an image 30 fields later than the image displayed in the image display area 52a before the wheel 8 was rotated, that is, an image one second later, will be displayed in the image display area 52a. As a result, when the wheel 8 is rotated through one revolution, an image one second later is displayed in each image display area 52. In this way, when one revolution of the wheel 8 is made to correspond to the movement of a moving image in one second, the user can easily grasp the frame by frame time of the image and can thus perceive the time more intuitively.

In the above description, one revolution of the wheel 8 is made to correspond to the movement of a moving image in one second; on the other hand, provisions may be made so that when the wheel 8 is quickly rotated from rest, the controller 20 performs control so that the image is moved first at slow speed and then, with a brief delay, the image moving speed is increased. By controlling the image moving speed in this way, the viewer can easily follow the first few frames of the image with the eye.

In this way, the controller 20 may perform control so as to vary the number of frames per revolution of the wheel 8 in accordance with the rotational speed of the wheel 8. Further, when provisions are made to stop the frame-by-frame movement of the image at the instant the rotating wheel 8 is stopped, the advantage is that the desired image can be easily selected.

Then, when the most favorite image is displayed in the image display area 52a by operating the wheel 8, the wheel 8 is pressed down. This causes the wheel switch 19 to close, and the selection is thus detected; thereupon, a signal indicating the detection is sent to the application activator 21 (see FIG. 2(b)). The application activator 21 then activates an application such as mail software for transmission of the selected image as an attached file. After the mail software is activated, usual mail software processing can be performed for transmission or other operation.

In the third embodiment described above, when the wheel 8 is depressed while the most favorite image is displayed in the image display area 52a, the application activator 21 activates an application; alternatively, when the wheel 8 is depressed while the most favorite image is displayed in the image display area 52a, the controller 20 may perform control so that the image displayed in the image display area 52a is expanded to a larger size for display in the window screen 50. In that case, the controller 20 functions as an expansion controller.

The picture count 55 and the slide bar 54 will now be described below. The picture count 55 indicates in digital form where in the entire set of still images is positioned the image currently displayed in the image display area 52a. In the example of FIG. 5, the picture count 55 shows that the 30th image in the entire set of 60 images is currently displayed in the image display area 52a. On the other hand, the slide bar 54, like the picture count 55, indicates where in the entire set of still images is positioned the image currently displayed in the image display area 52a, but provides the indication in analog form. The picture count 55 and the slide bar 54 each correspond to one example of a position indicator in the portable information apparatus of the present invention.

The above embodiment has described a method in which the image to be captured is selected by operating the wheel 8, but it is also possible to select the image by moving the prior known slide bar 54 left and right and thereby moving the image from one frame to the next. Alternatively, the image may be selected by using the wheel 8 in combination with the slide bar 54.

Further, in the embodiment described above, when the wheel 8 is rotated, the controller 20 causes the displayed images to move in accordance with the amount and direction of rotation of the wheel 8, but instead, the controller 20 may perform control so as to cause the pointer 56 to move successively through the image display areas 52 in accordance with the amount and direction of rotation of the wheel 8.

Furthermore, in the above embodiment, the images displayed in the respective image display areas 52 have been described as being still images forming a moving image, but the images displayed in the respective image display areas 52 are not limited to any particular type of image, and any type of image may be displayed.

As described above, the scroll operations of the window can be performed easily by only operating the wheel (jog dial) without moving the hand off the home position on the keyboard. Accordingly, various actions such as depressing a click button and rotating the trackball can be accomplished without performing cumbersome operations. As a result, scrolling across the window screen can be manipulated easily.

When dealing with a large number of still images captured by a digital camera or the like, any desired image can be selected from among the plurality of images displayed in thumbnail form by only operating the wheel for rotation.

Furthermore, when selecting a favorite shot from a moving image by a capture operation, the most desirable image can be selected easily and quickly while viewing the images before and after the image selected by operating the wheel. This achieves a portable information apparatus with enhanced operability that allows the above operations to be performed without moving the hand off the keyboard.

As is apparent from the above description, the present invention provides a coordinate input device that allows the user to operate the wheel without having to move his hand off the keyboard, and also provides a portable information apparatus equipped with such a coordinate input device.

What is claimed is:

1. A coordinate input device comprising:
   a keyboard;
   a rotary dial annular in shape and having a substantially flat upper surface mounted flush with the same plane of said keyboard, said upper surface of said rotary dial being rotatable within said plane; and
   a rotation detector for detecting the amount and direction of rotation of said rotary dial, and wherein:
   said rotary dial is disposed below said keyboard.

2. A coordinate input device according to claim 1, wherein said rotary dial is disposed so that the center of said rotary dial lies on a line that substantially bisects the width of said keyboard.

3. A coordinate input device according to claim 1, further comprising a depression detector for detecting depression of said rotary dial when said rotary dial is depressed in a direction perpendicular to said plane.

4. A coordinate input device according to claim 1, further comprising a trackball, a second rotation detector for detecting the amount and direction of rotation of said trackball, and one or more click buttons provided in positions adjacent to said trackball, and wherein:

said trackball and said click buttons are disposed within said plane in such a manner as to be surrounded by said rotary dial.

5. A coordinate input device according to claim 1, further comprising a flat pad which is touched by an object, a movement detector for detecting the distance and direction of movement of said object while said flat pad is being touched with said object, and one or more click buttons provided in positions adjacent to said flat pad, and wherein:

said flat pad and said click buttons are disposed within said plane in such a manner as to be surrounded by said rotary dial.

6. A coordinate input device according to claim 1, wherein said rotary dial is constructed so that when said rotary dial is rotated, various parts forming said rotary dial can stay stable in a plurality of positions within said plane.

7. A portable information apparatus comprising:

a coordinate input device as described in claim 1;

a display device having a screen for displaying information and a pointer for indicating a portion within said screen; and a controller for causing said information or said pointer displayed within said screen to move according to the amount and direction of rotation of said rotary dial.

8. A portable information apparatus according to claim 7, wherein said screen includes a scroll bar for scrolling said displayed information vertically or horizontally across said screen, and said controller causes said information displayed within said screen to scroll in accordance with the amount and direction of rotation of said rotary dial when said pointer is positioned on said scroll bar.

9. A portable information apparatus according to claim 7, wherein said information comprises a plurality of picture images, said pointer is used to select one of said plurality of picture images, and said controller causes said pointer to move in accordance with the amount and direction of rotation of said rotary dial.

10. A portable information apparatus according to claim 9, comprising an expansion controller for causing said image at which said pointer is positioned to be expanded to a larger size for display in said screen.

11. A portable information apparatus according to claim 9, comprising an application activator for activating a prescribed application, while at the same time, capturing said image at which said pointer is positioned.

12. A portable information apparatus comprising:

a coordinate input device as described in claim 1;

a display device having a screen with a plurality of image display areas arranged in the form of a ring and a pointer for indicating one of said plurality of image display areas; and a controller for causing said pointer displayed within said screen to move according to the amount and direction of rotation of said rotary dial.

13. A portable information apparatus comprising:

a coordinate input device as described in claim 1;

a display device having a screen with a plurality of picture image display areas arranged in the form of a ring and a pointer for indicating one of said plurality of picture image display areas; and a controller for causing a plurality of picture images to be displayed in said respective picture image display areas in such a manner that said plurality of picture images are displayed sequentially moving through said picture image display areas in accordance with the amount and direction of rotation of said rotary dial.

14. A portable information apparatus according to claim 13, wherein the size of said plurality of picture image display areas monotonically changes along said ring, and/or said plurality of picture image display areas are arranged with any two adjacent picture image display areas overlapping each other.

15. A portable information apparatus according to claim 14, wherein said plurality of images are temporally successive images.

16. A portable information apparatus according to claim 15, wherein said controller causes said plurality of images to be displayed in said respective image display areas in such a manner that, of said plurality of images, the most future image is displayed in the smallest size.

17. A portable information apparatus according to claim 13, comprising a position indicator for indicating in digital or analog form where in an entire set of said plurality of images is positioned the image displayed in a prescribed one of said plurality of image display areas.

18. A portable information apparatus according to claim 13, wherein said plurality of images are images such that the number of fields to be displayed per unit time is predetermined, and said controller causes said respective images to move by umber equal to the number of fields per second when said rotary dial is rotated through one revolution.

19. A portable information apparatus according to claim 13, wherein said controller performs control so that the number of times that said respective images are moved while said rotary dial is rotated through one revolution is varied according to the rotational speed of said rotary dial.

20. A portable information apparatus according to claim 13, comprising an application activator for activating a prescribed application, while at the same time, capturing the image displayed in a prescribed one of said plurality of image display areas.

* * * * *